(12) United States Patent
Johnson et al.

(10) Patent No.: US 6,937,133 B2
(45) Date of Patent: Aug. 30, 2005

(54) APPARATUS AND METHOD FOR RESOURCE ARBITRATION

(75) Inventors: Ian David Johnson, West Sussex (GB); Marek Stephen Piekarski, Cheshire (GB); Simon William Farrow, Manchester (GB); Brian Alan Whitehead, Manchester (GB)

(73) Assignee: Xyratex Technology Limited (GB)

( * ) Notice: Subject to any disclaimer, the term of this patent is extended or adjusted under 35 U.S.C. 154(b) by 835 days.

(21) Appl. No.: 09/855,903

(22) Filed: May 15, 2001

(65) Prior Publication Data

US 2001/0043612 A1 Nov. 22, 2001

(30) Foreign Application Priority Data

May 18, 2000 (GB) .............................. 0011842
Jul. 14, 2000 (GB) .............................. 0017221

(51) Int. Cl.[7] .............................................. H03K 17/00
(52) U.S. Cl. ..................... 340/2.28; 370/230
(58) Field of Search .............................. 340/2.28, 2.24, 340/2.7; 370/230, 229, 392, 396, 415, 429, 416, 413; 712/22

(56) References Cited

U.S. PATENT DOCUMENTS

| | | | |
|---|---|---|---|
| 5,175,858 A | * 12/1992 | Hammerstrom | 712/22 |
| 5,267,235 A | * 11/1993 | Thacker | 370/396 |
| 5,500,858 A | 3/1996 | McKeown | 370/60 |
| 5,541,916 A | 7/1996 | Nobuyuki | 370/60.1 |
| 5,923,644 A | * 7/1999 | McKeown et al. | 370/230 |
| 6,044,061 A | 3/2000 | Aybay et al. | 370/230 |
| 6,757,246 B2 | * 6/2004 | Alasti et al. | 370/230 |

FOREIGN PATENT DOCUMENTS

| | | |
|---|---|---|
| EP | 0623880 | 11/1994 |
| WO | 9714240 | 4/1997 |
| WO | 9731463 | 8/1997 |
| WO | 9819421 | 5/1998 |
| WO | 9911033 | 3/1999 |
| WO | 0038375 | 6/2000 |
| WO | 0038376 | 6/2000 |

OTHER PUBLICATIONS

Goudreau et al., "Scheduling Algorithms for Input–Queued Switches: Randomized Techniques and Expedrimental Evaluation", IEEE XP–002171491, pp. 1634–1643, Mar. 26, 2000.

* cited by examiner

Primary Examiner—Michael Horabik
Assistant Examiner—William Bangachon
(74) Attorney, Agent, or Firm—Pillsbury Winthrop Shaw Pittman LLP

(57) ABSTRACT

An arbitration process sets the connections to be made between ingress and egress ports of a crossbar switch of a data switching system. A weight parameter is used for each pair of ingress and egress ports. Connection requests are generated indicating ingress ports to be connected to egress ports. A selection is made among conflicting connection requests, to produce a connection proposal for each egress port. Any connection request for which respective weighting parameter is zero is not selected. When one of the connection requests is realised, the weight parameter corresponding to this connection is decreased by one. All the weight parameters for a given egress port are re-set to default values in the case that there are no connection requests for that egress port with non-zero weights.

10 Claims, 6 Drawing Sheets

Input   Output       Input   Output

Illegal (a)                              (b)

Legal (c)                              (d)

APPARATUS AND METHOD FOR RESOURCE ARBITRATION

FIELD OF THE INVENTION

The present invention relates generally to systems in which requesters compete for resources, and more particularly to a method and apparatus for arbitrating suitable matches between such requesters and resources.

BACKGROUND OF THE INVENTION

In many information processing systems having a number of system resources, often called servers, a set of requesters request service from the servers. The situation frequently arises that an arbitration must be performed between two or more requesters which request service from the same server.

For instance, in a data packet switching application, the requesters may each need to transmit one or more cells (i.e. small packets of information) to various ones of the servers. Each requester receives cells from one or more system users (e.g., components) that need to be forwarded to a specified one of the servers. If the requester has at least one cell that needs to be forwarded to a server, then the requester will generate a request for access. It is required to rapidly produce a set of one-to-one (point to point) matchings that maximizes the number of connections between requesters and servers. Preferably, the matchings should be produced without imposing significant overheads on the system.

Switching (i.e., connecting requesters to servers, or transmitting data from senders to receivers) involves two separate tasks. First, a scheduling task is performed, wherein an arbitration mechanism selects which of potentially many requests to send to each server. Second, a data-forwarding task is performed, in which a switching mechanism forwards requests or cells to servers in accordance with the selections made by the scheduling task.

Figure 1:
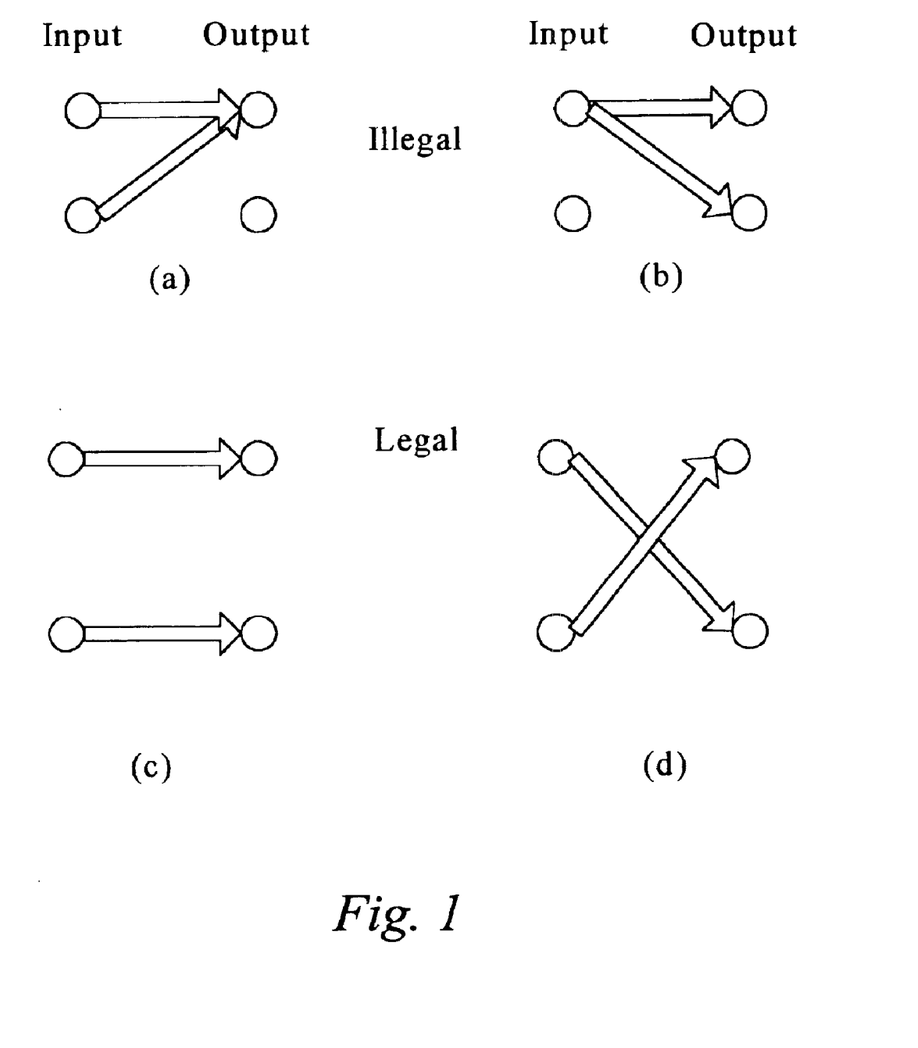
FIG. 1, which consists of FIGS. 1(*a*) to 1(*d*), shows the four possible connection combinations for a two-port switch.

At the centre of high-speed communication switches, there is generally a crossbar matrix switch to do the actual switching at the physical level. Crossbar switches enable point-to-point connections to be configured to connect one switch port to another. The crossbar has to have connections formed across it by some form of algorithm. FIG. 1 illustrates the restrictions. No two inputs can connect to the same output (FIG. 1(a)) and no two outputs can receive different cells from the same input (FIG. 1(b)), the acceptable solutions are FIGS. 1(c) and 1(d). This set of connections must be produced from a set of requests that come from the input ports. This is commonly known as a bipartite graph matching problem. There are many different solutions to this problem. Each solution addresses a different weakness and attempts to resolve it.

Figure 2:
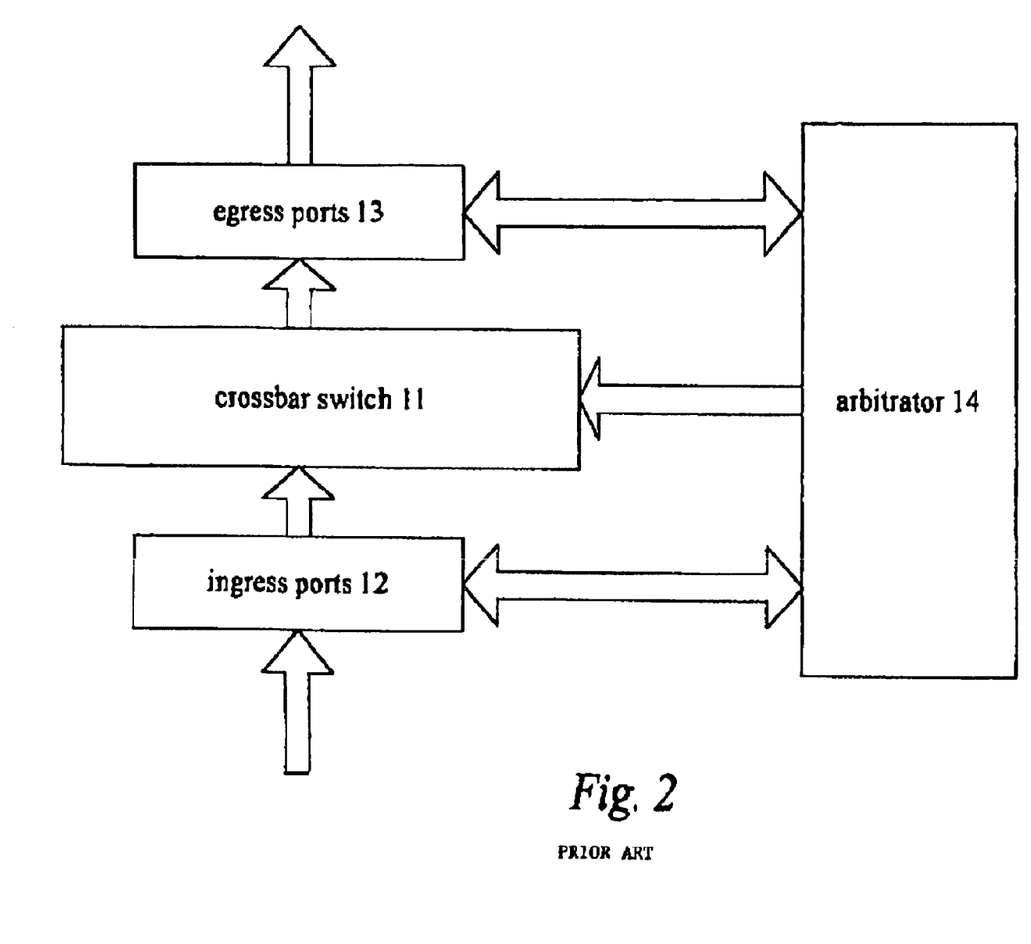
FIG. 2 shows the construction of a known arbitration system.

FIG. 2 shows a known arrangement of a switching fabric. The crossbar switch 11 provides connections between a set of ingress ports 12 and egress ports 13, and is controlled by an arbitrator unit 14. Typically, the ingress ports 12, upon receiving data packets, generate at least one connection request specifying an egress port, and send the connection request(s) to the arbitrator. The arbitrator 14 makes a decision about which connections to permit, and controls to the switch 11 accordingly. The arbitrator 14 further communicates with the ingress ports 12 to indicate which of the connection requests will be granted. The ingress ports 12 may be associated with memory devices which store data packets associated with connection requests which are not granted. The bipartite graph matching algorithm is performed by the arbitrator 14.

Nearly all known bipartite graph matching algorithms involve pointers. Each ingress port and each egress port has a pointer that indicates where the arbiter will attempt to construct connections. In most algorithms there is both grant and an accept pointer, these are associated with egress and ingress ports respectively. It is with the manipulation of these pointers that most algorithms are concerned.

Many known bipartite graph matching algorithms attempt to allocate potential connections fairly. In practice, this means that over a statistically significant period of time, potential connections will be distributed evenly between all of the ports with connection requests.

This definition of fairness corresponds to saying that bandwidth should be allocated as evenly as possible between the ports requesting connections. This definition is over-simplistic, and in the real world is much too rigid. What is really needed is the ability to control what bandwidth is allocated, where and to whom. It was with this aim in mind that probabilistic masking was developed (see GB 0008195.0, filed on 5 Apr. 2000, and entitled Data Switching Arbitration Arrangements). In this system connection bandwidth allocation is performed by a probabilistic masking unit placed before the arbitration stage. Probabilistic masking functions by (pseudo-)randomly removing connection requests to a varying degree before they reach the arbitration stage. Thus the bandwidth on that particular connection is limited by enforcing varying levels of quality of service. The probabilistic masking arrangement has a limitation that it does not operate in a work conserving manner, when a request is masked, potential bandwidth is lost. This bandwidth is not then allocated elsewhere.

SUMMARY OF THE INVENTION

It is an object of the invention to provide a new and useful arbitration system, such as one which overcomes this limitation.

According to the invention there is provided an arbitration method for selecting the connections to be made by a crossbar switch of a data switching system between a plurality of ingress ports and a plurality of egress ports, the arbitration method comprising:

(i) a request step of at least one ingress port transmitting one or more connection requests indicating egress ports to which a connection is required, (ii) a grant step of examining the connection requests, and, for each egress port for which there is a connection request, selecting one request for grant, and generating a grant signal indicative of the selected request; and (iii) an accept step of examining the grant signals and, for each ingress port for which there is a grant signal, selecting one grant signal to accept, thereby defining an ingress to egress port connection across the crossbar switch, characterised in that:

the method employs, for each possible combination of an ingress port and an egress port, a respective weight value, a connection request only being selected in said grant step if the corresponding weight value is not zero;

and the method further comprises:

each time a connection is made in the crossbar switch involving an ingress port and an egress port, decrementing the corresponding weight value; and in said grant step, if for a given egress port, there are no connection requests having non-zero weight values, the weight values are reset to default values before said selection.

The default values (which are positive integers) thus determine the statistical frequency with which a given ingress and egress port will be selected. In principle it is possible to select the default values for each combination of an ingress and an egress port to be equal; this may result in "fairness" in the simplistic sense discussed above. However, it is preferable that the default values are not all identical, for a given egress port but rather there are different default values for each respective ingress port, selected according to a desired statistical frequency of connections between specific ingress and egress ports.

Although the statement of the invention above refers to "decrementing" weight values and to the particular significance of weight values becoming "zero", it is to be understood that the statement includes any mathematically equivalent alternative. For example, the statement should be understood to include an alternative in which: each weight value has a predetermined sequence of values (for different weight values there may be different numbers of steps in each sequence); a connection is only accepted when the corresponding weight value is not at the final value of the sequence; when a connection is made, the corresponding weight value is advanced by one step in the sequence; and, in the grant step, if for all connection requests to a given egress port all the corresponding weight values are at the final step of the sequence, those weight values are reset to the first step of the sequence. All features disclosed in this document can be expressed straightforwardly in this generalised notation.

Note that steps (ii) and (iii) can be performed in an arbitration unit, e.g. as shown in FIG. 2. Alternatively, step (ii) can be performed locally at each egress port. In that case, in step (i) the connection requests are sent to the respective egress port. Similarly, step (iii) can be performed locally at each ingress port, in which case in step (ii) the grant signals are transmitted there.

According to one form of the invention there is provided an arbitration arrangement in which each connection request is applied to a masking element comprising a default weight register, programmed with the default weight to be allocated to the said ingress port by a system control device, and a working register whose contents are decremented by one each time a crossbar switch connection is made involving the said ingress port, the contents of the working register being used to mask the connection request generated by the ingress port when said contents are zero.

Also according to the invention there is a data switching system in which a crossbar switch makes connections between a plurality of ingress ports and a plurality of egress ports, the system comprising:

request means at each ingress port for transmitting one or more connection requests indicating egress ports to which a connection is required, grant means for examining the connection requests, and, for each egress port for which there is a connection request, selecting one request for grant, and generating a grant signal indicative of the selected request; and acceptance means for examining the grant signals and, for each input port for which there is a grant signal, selecting one grant signal to accept, thereby defining an ingress to egress port connection across the crossbar switch, characterised in that:

the switch further includes, for each possible combination of an ingress port and an egress port, a working register storing a respective weight value, the work register being arranged to decrement each weight value each time a connection is made in the crossbar switch involving the corresponding ingress port and egress port, and, if there are no connection requests to a given egress port having non-zero weight values, before said selection step to reset the weight values for the egress port to respective default values; and the grant means being arranged only to select a connection request if the corresponding weight value is not zero.

The present invention finds particular application in a local area-switching network, but the present invention may be applied in any application in which a rapid matching of requestors and servers is needed.

A procedure according to the present invention may provide maximal matching within a relatively small number of clock cycles. Fast matching is important so that the arbitration procedure can be repeated quickly for successive sets of requests. In particular, the arbitration procedure for one set of requests should be no longer than the amount of time needed to transmit the requests granted during the previous arbitration cycle. When the requests are small cells that are transmitted in just a few clock cycles, the arbitration mechanism has only a similar number of clock cycles to arbitrate competing requests. The arbitration mechanism of the present invention can be implemented using presently existing circuit components.

In one application of the invention each input port receives, and stores in an input buffer, a set of cells, with each cell member bearing an address that identifies an output port to which the cell requests routing. The arbitration mechanism now must satisfy not one request, but a set of requests. This is a relatively difficult and time-consuming task because many arbitration matches are possible between cells in the input port sets and the output ports. Some matches will be better than others will; the problem is to rapidly find a good match satisfying the largest number of contending requests.

The present arbitration arrangement makes it possible to take a data set of connection request bits and form connections obeying the rules described above in the crossbar arbitration section. When viewed over a statistically significant amount of time the connections formed by the algorithm are more or less likely to be formed depending on the weight allocated to that particular connection. The higher the weight for a connection the more likely it is for that particular connection to be formed. This ability to define the likelihood of connections being made enables deterministic work-conserving bandwidth management.

The new algorithm may incorporate all of the functionality that is provided by a probabilistic masking unit into the arbitration stage itself. In addition, to avoid all of the problems associated with probabilistic operation the new arbitration stage behaves in a deterministic way. This is achieved by taking an arbitration stage and adding extra functionality in the form of weights for each connection. When a connection is made, the weight is decremented; if there is no remaining weight the connection cannot be made. This extension gives all of the traffic shaping ability of probabilistic masking, while maintaining the work conserving nature of the arbitration stage. In addition, any residual bandwidth that is not being used is allocated in a work-conserving manner. Bandwidth allocation guarantees that a minimum level of service will be delivered under high load. Work conserving operation allows the switch to reduce latency under lower loads.

The granularity (that is, precision) of bandwidth allocation is controlled by the range of integer values that the weighting system can hold, the larger the values the finer the granularity. As the only limitation on the weight values is the size of the register that is used to hold their values, the granularity of bandwidth may easily be altered simply by using more bits.

BRIEF DESCRIPTION OF THE DRAWINGS

An embodiment of the invention will now be described in detail, for the sake of example only, with reference to the accompanying figures, in which.

DETAILED DESCRIPTION OF AN EMBODIMENT

The embodiment is described below with reference to FIGS. 3 to 6. It is based upon a three-stage arbitration algorithm. The first and third stages remain essentially the same as in known systems, but the second or grant stage is altered to incorporate the connection bandwidth allocation functionality. The arbitration controls a crossbar switch which is preferably without memory.

The algorithm may be implemented in a system as illustrated in FIG. 2, in which the functioning of the ingress ports 12, egress ports 13 and crossbar switch 11 is according to known technology, and the present technique particularly relates to the functioning of the arbitrator 14.

However, the present invention is not limited in this respect, and may by applied to any logically equivalent situation, for example one in which the arbitration processing is performed in a distributed fashion. For example, two sets of components which respectively perform the grant and accept steps of the method, may be located respectively proximate the ingress and egress ports.

Figure 3:
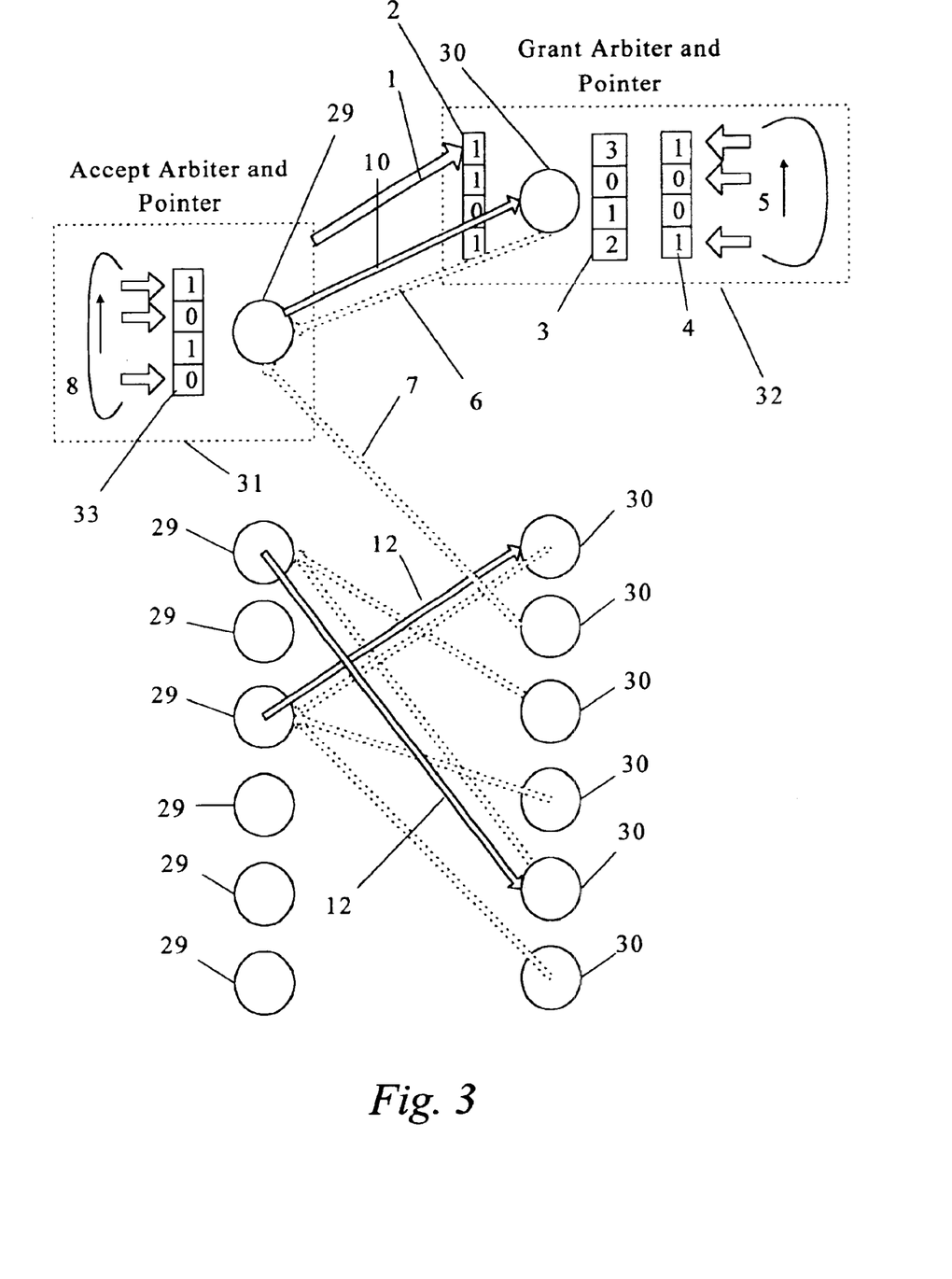
FIG. 3 shows schematically an embodiment of a method according to the invention.
Figure 4:
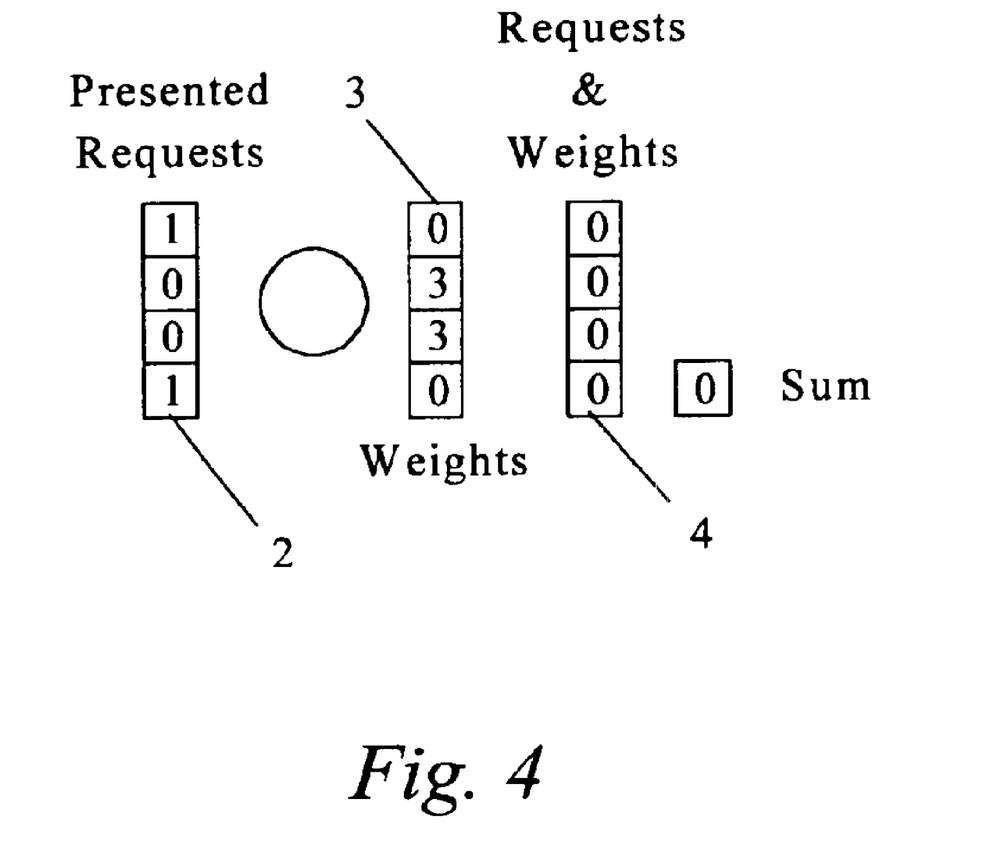
FIG. 4 gives an example of a weight value and connection request realisation which causes resetting of the weight values in the embodiment.

Referring to FIG. 3, the diagram shows the logical structure of an algorithm performed according to the invention. The figure represents the respective pointers of the ingress ports as circles 29, and the respective pointers of the egress ports as circles 30. The logic controlling the ingress pointer 29 which is uppermost in the figure is represented schematically as box 31 surrounding that ingress pointer 29, while the logic controlling the egress pointer 30 which is uppermost in the figure is shown schematically as box 32 surrounding the egress pointer 30.

Stage 1 Request

For a thirty-two-port system (thirty-two ingress ports and thirty-two egress ports), there are one thousand and twenty four possible connection request signals (thirty-two squared); this allows requests for connections from any point to any other point to be requested. Creation of requests may be according to conventional systems, as can the system for storage of data packets awaiting a suitable connection from the arbitration system.

For example, in FIG. 3 at the request stage, the box 31 sends a connection request 1 to the box 32, indicating that the ingress port associated with box 31 wishes to be connected to the egress associated with box 32.

Stage 2 Grant

The box 32 stores a table 2 which indicates which of the ingress ports wishes to connect to the egress port controlled by box 32. For simplicity, in the figure the table 2 is represented as having only four entries, but in fact it has a number equal to the number of ingress ports. An ingress port which has requested a connection to the egress port controlled by box 32 is given a 1 in table 2, and an ingress port which has not made such a connection request is represented as 0.

Box 32 further contains a table 3 containing, for each of the ingress ports (only 4 are shown for simplicity) a respective weight value. A further table 4 contains an entry for each ingress port. The entry is 1 if the respective entry in both of tables 2 and 3 is non-zero, and 0 otherwise. For example, the entry of the table 3 associated with the ingress port of box 31 has a weight of 3, so the corresponding entry of table 4 is 1.

In box 32, two processes are performed to establish which request to grant.

Firstly, the weight table for each port must be checked to see if it should be reset to its original allocation values. The reset condition is that every port with a request has a weight of zero. This condition is exemplified by the state of the box 32 shown in FIG. 4. The sum of the entries in table 4 is zero, and so the weights should be re-set to their default values. The lack of a request from a particular input port effectively masks the weight for that port, removing it from the reset calculation. The default values are held in another set of registers/RAM that can be written to, to alter the bandwidth allocation parameters of the arbiter. After this step, the table 4 is recalculated.

The second process is a round robin illustrated in FIG. 3 as by reference numeral 5. The round robin pointer always moves from the last ingress port for which a request was granted, to the next ingress port for which the corresponding entry in table 4 is 1.

In other words, as the pointer moves around the set of requests, for a request from a given ingress port to be granted the corresponding value in table 4 must be greater than zero. The weights in effect temporarily mask certain requests.

Although requests are being rejected, this algorithm remains work conserving. Because the weights are re-set in the case that all the entries in table 4 are 0 (and table 4 then recalculated), and assuming that at least one entry in table 2 is non-zero, by the time the round robin is performed there will always be at least one entry in table 4 which is equal to 1, so one connection request will always be granted. This work conserving nature guarantees a minimum bandwidth at high load, but allocates more if it becomes available.

In FIG. 3 the round robin selects the entry which corresponds to the ingress port associated with box 31. The egress pointer 30 is set equal to this ingress pointer, and a grant signal 6 is transmitted to the box 31.

Simultaneously, the box 31 receives another grant signal 7 in respect of another egress port. Grant signals are shown in FIG. 3 by the light arrows.

Stage 3 Accept

In the third stage of the arbitration, each port which has received a grant signal uses a round robin 8 to pick which one to accept. In the figure, the box 31 generates a table 33 having a number of entries equal to the number of egress ports (only four are shown here, for simplicity), and having an entry of 1 for egress ports for which there is a grant signal, and 0 otherwise. The box 31 uses round robin 8, which in this case selects acceptance of the egress port associated with box 32. Once an input and an output port have negotiated a connection, they then set the appropriate blocked flags, eliminating themselves from the selection process. Once a connection has been confirmed, the weight for that connection (the entry in table 3) is decremented by one. The grant and accept pointer values for the connection concerned are then updated. The pointer from the ingress pointer of box 31 is shown by the dark arrow 10, and dark arrows 12 indicate the values of other ingress pointers at the end of the arbitration process.

The masking effect of the weights is similar to that of probabilistic masking; however, the new algorithm behaves in a deterministic way.

Figure 5:
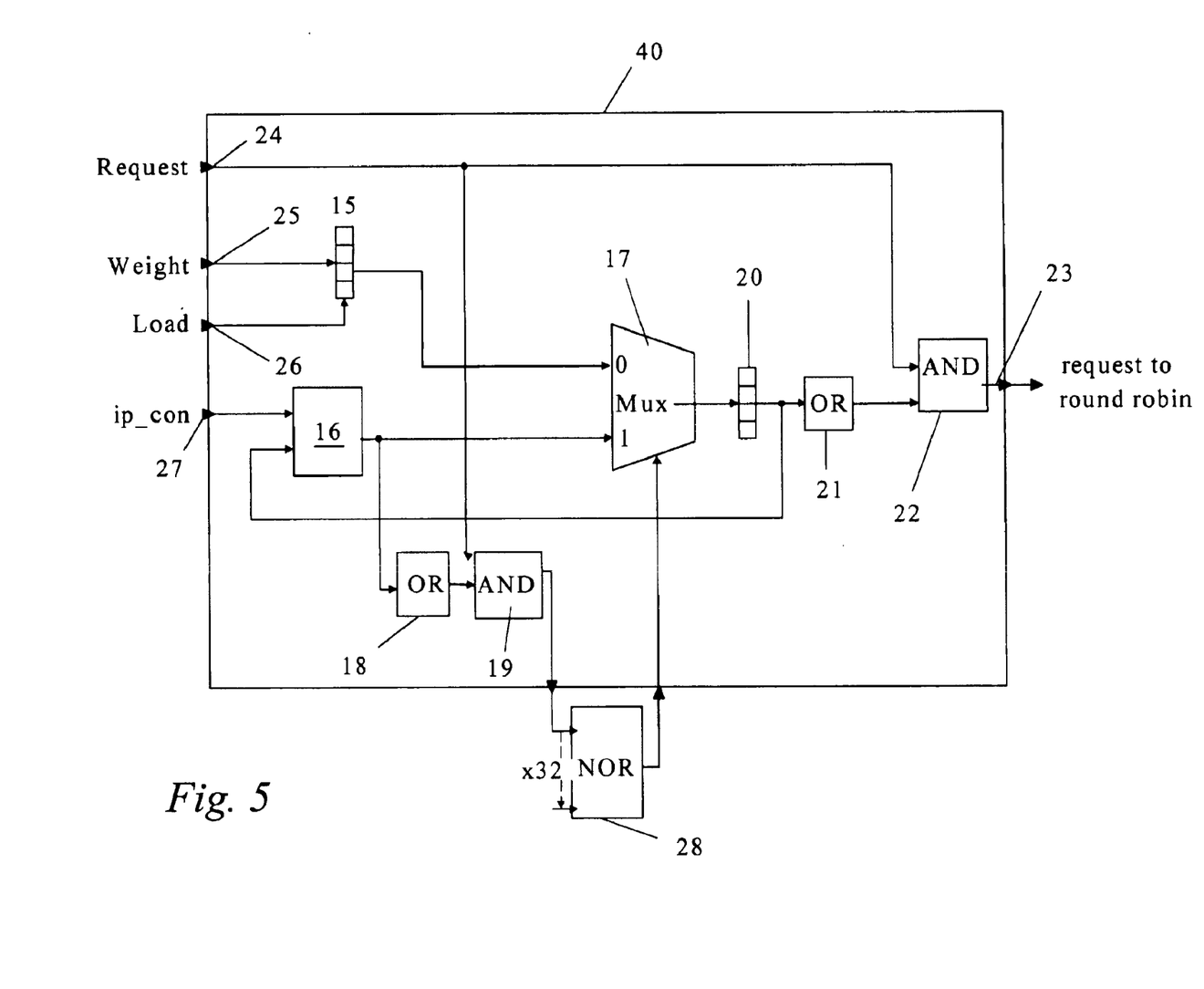
FIG. 5 shows an example of a masking element for use in the embodiment.
Figure 6:
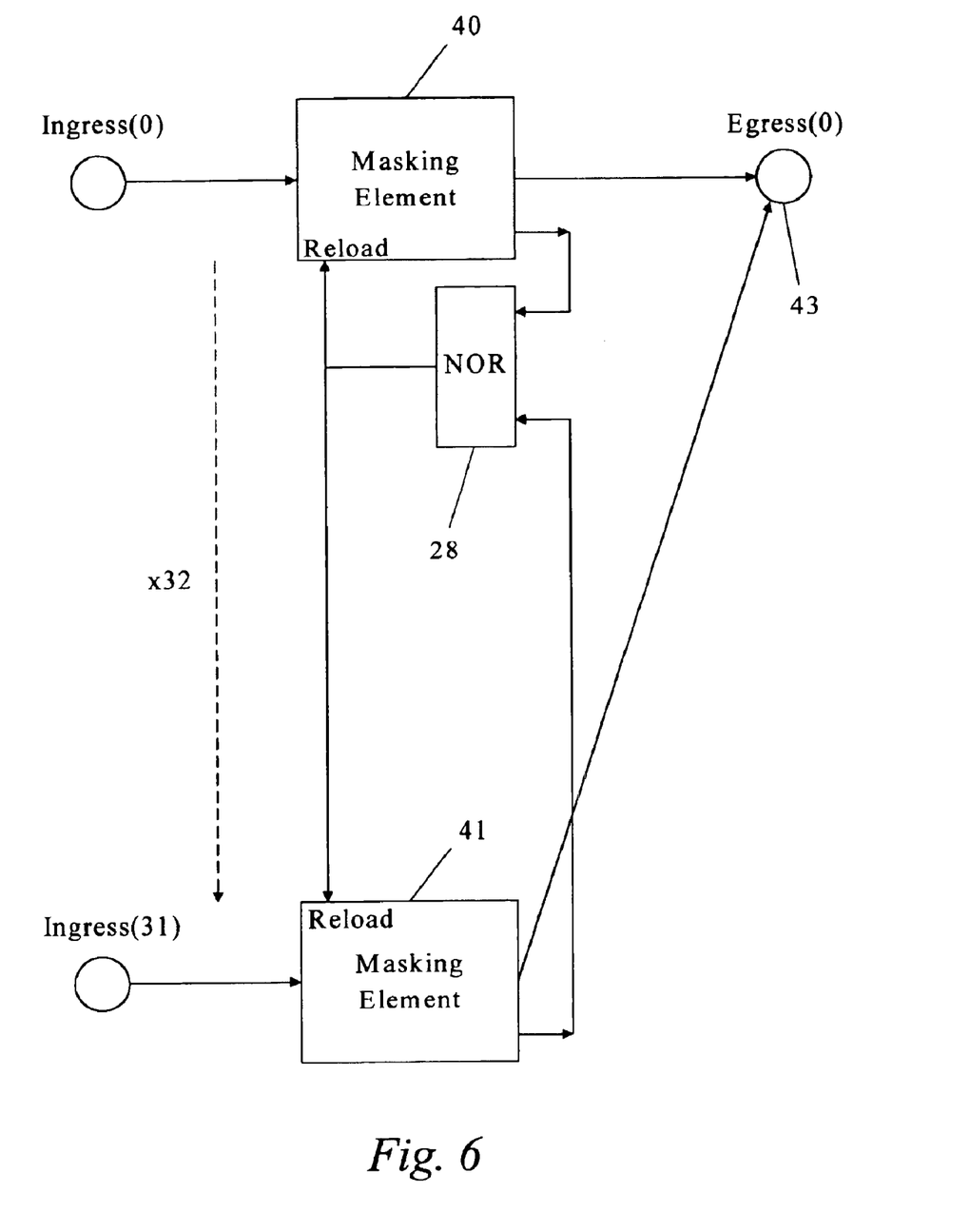
FIG. 6 shows circuitry used to produce resetting in the embodiment.

The changes to the grant stage of the known arbitration process detailed above to produce the arbitration process of the present embodiment are implemented using a masking element that is inserted in front of the grant round robins. In a thirty-two-port arbitration process, there would need to be one thousand and twenty four masking elements. FIG. 5 shows the Register Transfer Level (RTL) design of one individual masking element 40. FIG. 6 shows the construction of one egress port from thirty-two masking elements. In embodiments of the invention which have the physical structure of FIG. 2, this circuitry is provided in the arbitrator unit 14.

Masking Element Operation

This sequence references FIG. 5

1. Masking element 40 receives request signals (through port 24), default weight signals (through port 25), load signals (through port 26) and a signal ip-con (through port 27) indicating when a connection for this combination of ingress and egress ports is accepted. The weighting for the one request is loaded into the default weight register 15.

First Cycle:

2. This default weight held by weight register 15 is then transferred onto the working register 20, via the multiplexor 17, on a signal from the clock PGT which signifies the start of the first cycle.

3. The non-zero status of the weight in the working register 20 is determined by the OR gate 21.

4. The status determined by OR gate 21 is then used to mask out the request received through port 24 if the status of the working register 20 is zero. This is performed by the AND gate 22 to generate a signal output through output port 23 to a round robin.

5. The value of the weight in working register 20 is passed to the Decrementer 16. If a connection has been received due to a request made on the previous cycle (i.e. the input to port 27 is 1) the value of the weight is decremented by one and returned to working register 20. Otherwise, the decrementer 16 outputs the weight it received from the working register 20.

6. The non-zero status of the decremented weight is determined by the OR gate 18.

7. If there is a request in this cycle as determined by the input to port 20, and the weight value has been decremented to produce a non-zero result as determined by OR gate 18, then the reset condition for this request has been met. This product function is provided by AND gate 19.

8. When this condition has been met for all requests to a single egress port, the default weights for all requests to this egress port are required to be reloaded into their relevant working registers 20. This is determined by NOR gate 28, which has a similar connection to all other masking elements for this egress port.

FIG. 6 shows how the NOR gate 28 of FIG. 5 controls 32 masking elements (including the masking element 40), associated respectively with 32 ingress ports labelled ingress (0) to ingress (31). The 32 masking elements produce respective outputs which are passed to the round robin 43 of an egress port. In the case of FIG. 6 this is the egress port called egress port (0). The reset of the masking elements in the case that the output of the NOR gate 28 is zero occurs since in this case, and in this case only, the output of multiplexer 17 is the value in table 15 rather than the output of the decrementer 16.

Although the invention has been described above with reference to a single embodiment, many variations are possible within the scope of the invention, as will be clear to an expert.

What is claimed is:

1. An arbitration method for selecting the connections to be made by a crossbar switch of a data switching system between a plurality of ingress ports and a plurality of egress ports, the arbitration method comprising:

(i) a request step of at least one ingress port transmitting one or more connection requests indicating egress ports to which a connection is required, (ii) a grant step of examining the connection requests, and, for each egress port for which there is a connection request, selecting one request for grant, and generating a grant signal indicative of the selected request;

(iii) an accept step of examining the grant signals and, for each ingress port for which there is a grant signal, selecting one grant signal to accept, thereby defining an ingress to egress port connection across the crossbar switch;

(iv) employing, for each possible combination of an ingress port and an egress port, a respective weight value, a connection request only being selected in said grant step if the corresponding weight value is not zero;

(v) each time a connection is made in the crossbar switch involving an ingress port and an egress port, decrementing the corresponding weight value; and (vi) in said grant step, if for a given egress port, there are no connection requests having non-zero weight values, resetting the weight values to default values before said selection.

2. A method according to claim 1 in which the default values for different respective weight values of at least one egress port are nor equal.

3. A method according to claim 2 in which the default values are selected according to a desired statistical frequency or connections between specific ingress and egress ports.

4. A method according to claim 1 in which in said grant step, each connection request is applied to a masking element having a working register whose contents are decremented by one each time a crossbar switch connection is made involving the said ingress port, the contents of the working register being used to mask the connection request generated by the ingress port when said contents are zero.

5. A method according to claim 4 in which said masking element further comprises a default weight register, programmed with the default weight to be allocated to said working register by a system control device, and said resetting comprises copying the value in the default weight register to the working register.

6. A data switching system in which a crossbar switch makes connections between a plurality of ingress ports and a plurality of egress ports, the system comprising:

request means for each ingress port arranged to transmit one or more connection requests indicating egress ports to which a connection is required, grant means for examining the connection requests, and, for each egress port for which there is a connection request, selecting one request for grant, and generating a grant signal indicative of the selected request; and acceptance means for examining the grant signals and, for each input port for which there is a grant signal, selecting one grant signal to accept, thereby defining an ingress to egress port connection across the crossbar switch, wherein the switch further includes, for each possible combination of an ingress port and an egress port, a working register storing a respective weight value, the working register is arranged to decrement each weight value each time a connection is made in the crossbar switch involving the corresponding ingress port and egress port, and, if there are no connection requests to a given egress port having non-zero weight values, to reset the weight values for the egress port to respective default values before selecting said connection request; and the grant means is arranged to select a connection request only if the corresponding weight value is not zero.

7. A system according to claim 6 in which the default values for different respective weight values are not equal.

8. A system according to claim 6 in which said grant means includes for each combination of an ingress port and egress port a respective masking element including said respective working register, the contents of the working register being arranged to mask the connection request generated by the ingress port when said contents are zero.

9. A system according to claim 8 in which said masking element further comprises a default weight register, programmable with the default weight to be allocated to the working register by a system control device, and said grant means is arranged to reset the weight values by copying the value in the default weight register to the working register.

10. A local area-switching network comprising a system according to claim 6.

* * * * *